June 4, 1935.　　　W. M. JORDAN　　　2,003,366

FISHING LURE

Filed June 24, 1931

INVENTOR.
William M. Jordan.
BY
ATTORNEY.

Patented June 4, 1935

2,003,366

UNITED STATES PATENT OFFICE 2,003,366

FISHING LURE

William M. Jordan, Birmingham, Ala., assignor to South Bend Bait Company, South Bend, Ind.

Application June 24, 1931, Serial No. 546,582

12 Claims. (Cl. 43—42)

The invention relates to fishing lures, and particularly to improvements in fishing lures for use in fly-casting and of the general type described in my Patents #1,606,078, November 9, 1926, and #1,657,966, January 31, 1928, in which an elongated plate forms the body of the lure and fixedly carries a hook whose shank extends longitudinally of the plate.

The invention has for its principal object to provide a lure of this character in which a portion of the plate blank forming the body of the lure is bent double to form a weighted head end for the lure.

A further object is to provide a lure of this character having novel means for securing the hook in operative relation to the lure body.

A further object is to provide a lure of this character in which a return bent portion of the plate body forms a weighted head end therefor and, in combination with hook securing means, positions and secures a hook in operative relation to the body plate.

A further object is to provide a lure of this character in which the line attaching means is secured directly to the hook shank.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
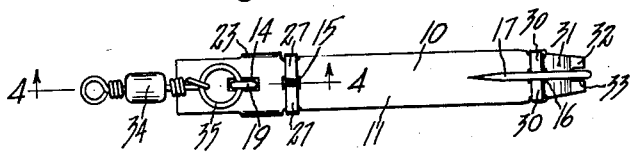
Figure 1 is a top plan view of the lure.
Figure 2:
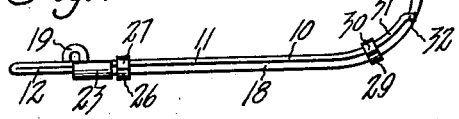
Figure 2 is a view of the lure in side elevation.
Figure 3:
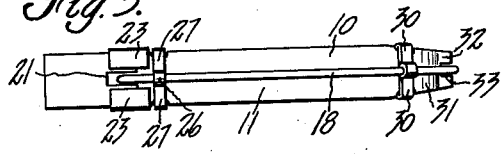
Figure 3 is a bottom plan view of the lure.
Figure 4:
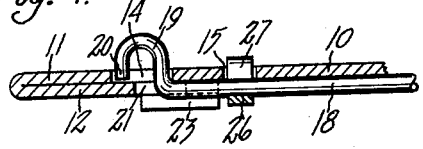
Figure 4 is a fragmentary longitudinal sectional view of the lure taken on line 4—4 of Figure 1.
Figure 5:
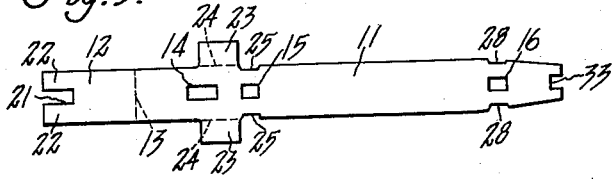
Figure 5 is a plan view of the plate blank forming the body of the lure.

Referring to the drawing, which illustrates the preferred embodiment of the invention, the numeral 10 designates the body of the lure which is formed of an elongated, relatively thin plate 11, preferably formed of metal. The plate 11, as best shown in Figure 4 has formed, as an integral part thereof at its forward end, a portion 12, which is adapted to be bent rearwardly downwardly on dotted line 13 into face-contacting or return-bent relation with the under side of the plate to form a weighted head end for the plate, as best shown in Figures 2 and 4. The plate 11 is provided with a plurality of longitudinally spaced apertures 14, 15 and 16 formed centrally therein, the forward aperture 14 being spaced rearwardly of the bend line 13 of the plate a distance substantially less than the length of portion 12 of the plate, for purposes to be hereinafter set forth. A hook 17, preferably single pronged, is positioned with its shank 18 extending longitudinally of the plate 11 in substantially contacting relation therewith throughout its length and with its pointed end extending longitudinally forwardly above the rear end of the plate, and the shank 18 terminates in an upwardly directed U-shaped bend 19 adapted to pass through the aperture 14 of the plate with its free end 20 positioned within the aperture when the hook shank is in operative position in contacting relation with the plate 11, as best shown in Figure 4. The aperture 14 is preferably of a size to effectively hold the bent portion 19 of the hook shank against substantial longitudinal or lateral movement therein. The portion 12 of the plate is notched at 21 at its outer end to form arms 22 spaced apart a distance equal to the width of aperture 14, the inner edge of said notch being spaced from bend line 13 a distance slightly greater than the forward edge of aperture 14, whereby portion 12 underlies the front portion of aperture 14 when in operative bent position, and the arms 22 extend rearwardly along the sides of said aperture. Thus the bent portion 12 underlies the free end 20 of the bent portion 19 of the hook shank and prevents the withdrawal of said bent portion 19 from the aperture 14. A line attaching swivel 34 is carried by a ring 35 engaging the bent portion 19 of the hook shank, and is effectively locked thereto by the bent portion 12 of the plate which prevents withdrawal of the shank bend 19 from aperture 14.

Laterally extending tabs 23 are formed on opposite sides of the plate 11 in spaced relation to the forward end thereof and are adapted to be bent downwardly along dotted lines 24 around and under the return bent portion 12 of the plate to secure said bent portion in operative contacting relation with the under side of the plate, and these tabs form additional means weighting the forward under side of the plate body. The forward edge of aperture 15 is disposed in substantial alignment with the rear edge of the tabs 23 in rearwardly spaced relation to aperture 14, and the sides of plate 11 are slightly notched at 25 in registering relation with said aperture 15. A clip 26 encircles the shank 18 of the hook and has a pair of arms 27 which extend upwardly through the aperture 15 and are oppositely outwardly bent therefrom and are thence downwardly bent into face contacting relation with the under side of plate 11, said arms being positioned in the notches 25 at the sides of the plate. The aperture 16 is formed in spaced relation to the rear of the plate 11, and notches 28 are formed in the sides of the plate in registration therewith, and a clip 29 having arms 30 encircles the hook shank with its arms passing through apertures 16 and around the plate and resting in notches 28 in the same manner as clip 26. Thus the hook shank is securely held relative to the plate by the clips 26 and 29 adjacent its front and rear ends, as well as being positioned and held by its bent portion 19 which passes through aperture 14. The sides of the plate 11 preferably taper inwardly at the rear thereof, and the plate is curved at its rear end at 31 in conformance with the curvature of the hook shank, and terminates in a portion 32 extending rearwardly from said curved portion in substantially parallel relation to the forward end of the plate. A central notch 33 is formed in the portion 32 of the plate at the rear thereof, and is adapted to receive and position the curved portion of the hook shank 18 at the rear of the plate.

It will thus be seen that a lure is provided with a weighted head end formed by a return bent portion of the body-forming plate blank and by tabs carried by the body and positioning said return bent portion. The line attaching means is secured directly to the hook shank whereby the stress incident to the landing of fish is exerted directly on the hook, rather than on the body forming plate. And the hook is securely held and positioned relative to the body-forming plate by the hook securing clips, the apertures receiving the bent portion of the hook shank and the cooperating underlying return bent portion of the plate, and the notched rear end of the body-forming plate, whereby the plate forms a reinforcement for the hook shank.

Figure 6:
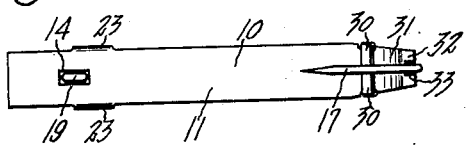
Figure 6 is a top plan view of a modified construction of the lure.

In Figure 6 is illustrated a modified form of the lure in which the forward clip 27 of the preferred construction is eliminated. In this construction the clip 29 and the notch 33 formed in the plate serve to hold the hook shank in operative relation to the rear of the plate; and the bent end portion 19 of the hook shank mounted in the aperture 14 and held therein by the return bent portion 12 of the plate which underlies the end 20 of the bend 19 serves to effectively and operatively secure and position the forward end of the hook shank to the body-forming plate. The plate is weighted at its forward under side by the downwardly return bent portion 12 thereof and by the tabs 23 in the same manner as in the preferred construction.

The invention having been set forth, what is claimed as new and useful is:—

1. A lure comprising an elongated relatively thin plate, a hook having its shank extending longitudinally of said plate, and means securing said hook shank to said plate, said plate having a portion thereof at its forward end bent into face contacting relation therewith to form a weighted head end preventing spinning of said plate as it is drawn through the water.

2. A lure comprising an elongated relatively thin plate, a hook having its shank extending longitudinally of said plate, means securing said hook shank to said plate, said plate having a portion thereof at its forward end bent into face contacting relation with said plate, and means holding said bent portion in operative relation to said plate, the bent portion of said plate and said last named means weighting the forward end of said plate to prevent spinning of said plate as it is drawn through the water.

3. A lure comprising an elongated relatively thin plate, a hook having its shank extending longitudinally of said plate, and means securing said hook shank to said plate, said plate having a portion thereof at its forward end downwardly bent into face contacting relation with said plate, and having tabs integrally formed therewith and projecting from the sides thereof in spaced relation to the forward end thereof, said tabs being downwardly and inwardly bent around the bent portion of said plate to hold it in operative relation thereto, said tabs and bent portion weighting the forward under side of said plate to maintain the same in operative position as it is drawn through the water.

4. A lure comprising an elongated relatively thin plate having an aperture formed adjacent its forward end, a hook having a shank terminating in a bent portion disposed in said aperture, and means securing said hook shank to said plate, said plate having an integral downwardly return bent portion at its forward end forming a weight maintaining the lure in operative position as it is drawn through the water.

5. A lure comprising an elongated relatively thin plate having an aperture formed adjacent its forward end, and a hook having a shank terminating in a U-bend disposed in said aperture, said plate having an integral downwardly return bent portion partially underlying said aperture to lock said bend in said aperture, said return bent portion forming a weight at the forward under side of the plate for maintaining the plate and hook in operative position as the lure is drawn through the water.

6. A lure comprising an elongated relatively thin plate having a pair of spaced apertures therein, a hook having a shank extending longitudinally of the body, and clips encircling said hook shank and passing through said apertures to secure said hook shank to said plate, said plate having an integral downwardly return bent portion at its forward end forming a weight maintaining the plate and hook in operative position as the lure is drawn through the water.

7. A lure comprising a plate having an aperture therein, a hook having a shank extending along one face of said plate, and a clip encircling said hook shank and passing through said aperture with its ends bent around said plate to fixedly secure said hook shank to said plate.

8. A lure comprising an elongated relatively thin plate having a plurality of spaced apertures therein, a hook having a shank extending longitudinally of said plate, said hook shank terminating in a bend extending through one of said apertures, said plate having an integral downwardly return bent portion partially underlying said bend receiving aperture to lock said bend in said aperture, and a clip engaging said hook shank and passing through another of said apertures to secure said hook shank in operative relation to said plate, the return bent portion of said plate forming a weight at the forward end of said plate for operatively positioning said plate and hook as the lure is drawn through the water.

9. A lure comprising an elongated relatively thin plate having an aperture formed adjacent the forward end thereof, a hook having a shank extending longitudinally of said plate, said hook shank terminating in a bend extending through said aperture, a line attaching means carried by said bend, said plate having a downwardly return bent portion at its forward end partially underlying said bend receiving aperture to lock said bend in said aperture, and means securing said hook shank to said plate adjacent the rear end thereof.

10. A lure comprising an elongated relatively thin plate having an aperture formed adjacent the forward end thereof and a notch formed in the rear edge thereof, a hook having a shank extending longitudinally of said plate, said hook shank having a bend formed at the forward end thereof and extending through said aperture, said plate having a forward downwardly return bent portion underlying a portion of said aperture to lock said bend in said aperture and forming a weight at the forward under side of the plate, and means securing said hook shank to said plate, the curved portion of said hook shank extending through said notch.

11. A lure comprising an elongated relatively thin plate having a plurality of spaced apertures formed therein and a notch formed in its rear edge, a hook having a shank extending longitudinally of said plate with its curved portion positioned in said notch, said shank having a U-bend extending through one of said apertures adjacent the forward end of the plate, said plate having a forward downwardly return bent portion partially underlying said bend receiving aperture to lock said bend in said aperture, tabs projecting from the sides of said plate and bent around said return bent portion, said return bent portion and tabs forming a weight at the forward under side of the plate to operatively position the plate and hook as the lure is drawn through the water, and means engaging said hook shank and passing through another of said apertures to operatively secure said hook shank to said plate.

12. A lure comprising an elongated relatively thin plate, a hook having its shank extending longitudinally of said plate, and means securing said hook shank to said plate, said plate having a portion thereof at its forward end bent into face contacting engagement with the under side thereof to form a weighted head end preventing spinning of said plate as it is drawn through the water.

WILLIAM M. JORDAN.